(12) United States Patent
Freiberg

(10) Patent No.: US 7,949,559 B2
(45) Date of Patent: May 24, 2011

(54) CREDIT CARD REWARDS PROGRAM SYSTEM AND METHOD

(75) Inventor: Steven Freiberg, Jericho, NY (US)

(73) Assignee: Citicorp Credit Services, Inc., Long Island City, NY (US)

( * ) Notice: Subject to any disclaimer, the term of this patent is extended or adjusted under 35 U.S.C. 154(b) by 1443 days.

(21) Appl. No.: 10/824,935

(22) Filed: Apr. 15, 2004

(65) Prior Publication Data

US 2004/0238622 A1 Dec. 2, 2004

Related U.S. Application Data

(60) Provisional application No. 60/473,424, filed on May 27, 2003.

(51) Int. Cl.
*G06Q 30/00* (2006.01)
*G05Q 19/418* (2006.01)
(52) U.S. Cl. .................. 705/14.27; 235/384; 705/17
(58) Field of Classification Search .............. 705/14, 705/17, 14.27; 235/384
See application file for complete search history.

(56) References Cited

U.S. PATENT DOCUMENTS

| | | | |
|---|---|---|---|
| 5,021,953 A * | 6/1991 | Webber et al. ............... | 705/6 |
| 5,056,019 A | 10/1991 | Schultz et al. | |
| 5,466,919 A | 11/1995 | Hovakimian | |
| 5,513,102 A | 4/1996 | Auriemma | |
| 5,537,314 A | 7/1996 | Kanter | |
| 5,774,870 A * | 6/1998 | Storey ............... | 705/14 |
| 5,806,045 A | 9/1998 | Biorge et al. | |
| 5,864,822 A | 1/1999 | Baker, III | |
| 5,945,653 A | 8/1999 | Walker et al. | |
| 6,018,718 A | 1/2000 | Walker et al. | |
| 6,609,658 B1 * | 8/2003 | Sehr ............... | 235/384 |
| 6,842,739 B2 | 1/2005 | Postrel | |
| 6,847,935 B1 | 1/2005 | Solomon et al. | |
| 2003/0078864 A1 * | 4/2003 | Hardesty et al. ............ | 705/35 |
| 2004/0049459 A1 * | 3/2004 | Philliou et al. ............ | 705/40 |

FOREIGN PATENT DOCUMENTS

| | | |
|---|---|---|
| JP | 2002-222353 | 8/2002 |
| WO | WO 01/29750 A1 | 4/2001 |

OTHER PUBLICATIONS

"Alaska airlines and Rainier National Bank are joining forces to link frequent flyer mileage to purchases made on a new visa card". Business Editors/ travel writers. May 5, 1987.*
Materials from<www.carmilesplus.com> (9 sheets).
Materials from<www.frequentdrivermiles.com> (4 sheets).

* cited by examiner

*Primary Examiner* — John G Weiss
*Assistant Examiner* — Victoria Vanderhorst
(74) *Attorney, Agent, or Firm* — Kramer Levin Naftalis & Frankel LLP

(57) ABSTRACT

A platform and program for enhancing the value and desirability of a credit card (or other payment product) to a card holder and encouraging increased use of the card as a payment device by rewarding the card holder based not only on qualifying purchases but on miles traveled in connection with travel ticket or travel pass purchases. The inventive program leverages qualifying transaction information and other data (e.g., Level 3 Data) which automatically flow with such transaction information. The rewards redeemed by the card holder according to the inventive platform and program are not tied to a particular provider of goods or services, and reward fulfillment is managed through the card issuer or its fulfillment agent.

64 Claims, 2 Drawing Sheets

CREDIT CARD REWARDS PROGRAM SYSTEM AND METHOD

CROSS REFERENCE TO RELATED PROVISIONAL APPLICATION

This application claims the benefit of U.S. Provisional Patent Application No. 60/473,424 filed on May 27, 2003.

BACKGROUND OF THE INVENTION

The present invention is directed to a credit card, bank card, charge card, or other payment product, and more particularly, to a system and method for enhancing the value and desirability of such a card to both the card holder and to the bank, financial institution or other issuer of the card through a rewards platform and program which provide the card holder with a benefit based on not only a qualifying purchase, but on miles traveled using a travel ticket, travel pass or the like purchased with the card.

Credit cards or charge cards allow card holders to pay for services and/or merchandise without using cash at the time of purchase. Credit cards are generally issued by a bank or other financial institution and provide a mechanism by which a card holder can receive a temporary loan from the bank for the purpose of paying for the purchase. The card holder may thereafter either pay the outstanding balance or, as a matter of choice, defer the balance for later payment with accompanying interest or finance charges for the period during which payment of the debt is deferred.

Credit cards are ubiquitous in today's society. Many consumers have more than one credit card and regularly use different credit cards to make their various purchases. Banks and financial institutions issue credit cards and service credit card accounts. The issuer may also generate revenue through a per transaction fee or commission charged to retailers and other merchants when the retailer processes a credit card holder's purchase, and from finance charges accrued when the credit card holder incurs a revolving balance on that issuer's credit card.

A credit card issuer would prefer that card holders predominantly use that issuer's credit card in order to generate the largest amount of fees and revenue. Therefore, the credit card issuer may offer incentives to card holders who use that issuer's card. Often the incentives are accumulated when the card holder uses the credit card. This benefits the card issuer because, with credit card usage, comes the opportunity for the card issuer to generate fees and revenue.

Banks and other financial institutions can also offer credit cards that provide the credit card holder with a particular benefit every time a purchase of goods or services using that card is made as an incentive for the credit card holder to use their credit card. For example, the benefit may be a certain amount of frequent flyer miles, or a discount voucher good toward the purchase of a gift or other merchandise. These benefits are vigorously promoted by the banks or card issuing organizations.

Increasingly, credit cards are being issued by banks and financial institutions in association with other commercial companies or businesses which themselves offer goods and/or services. This phenomenon, known as co-branding, provides a credit card that often carries the name of the commercial company along with the issuer's name. The commercial company often provides the credit card holder certain benefits which are typically related to the goods or services provided by that commercial company. An example of a co-branded credit card is the General Motors card (MASTERCARD or VISA) which offers credit card holders 5% earnings on card purchases toward the purchase or lease of a new General Motors vehicle.

With all the various benefit and incentive programs available from credit card issuers, consumers may have difficulty choosing between the different credit cards that they hold when deciding to make a purchase. For example, should the credit card holder choose to use a card that provides frequent flyer miles, or a card that provides some other benefit? Also, since benefit and incentive programs sponsored by a particular commercial company require that the credit card holder redeem benefits from that sponsoring company or its commercial partners, consumer choice is limited. For example, if the credit card holder is accumulating frequent flyer miles with one airline, the card holder is constrained to use that airline or its frequent flyer program partners when planning a trip if the card holder is to take advantage of the benefit. Because of the limits on redemption, the appeal of the card may be less than universal.

An opportunity therefore exists for a new credit card rewards platform and program which offer valuable benefits to card holders automatically based on not only qualifying purchases using the card, including, for example, purchases of travel tickets, travel passes or the like, but on miles traveled using tickets or passes purchased with the card, while providing flexibility to the card holders in the choice of rewards benefits.

SUMMARY OF THE INVENTION

Generally speaking, a system and method is provided for rewarding a user of a credit card, bank card, smart card, ATM card, debit card or other payment product based on not only a qualifying purchase, including of a travel ticket, travel pass or the like (from any carrier or carrier agent), using the card, but on miles traveled using the purchased ticket or pass.

In accordance with the system and method of the present invention, a bank or other financial institution issues a credit card or other payment product to a consumer. The card holder earns points automatically for every qualifying purchase including travel (e.g., airline) ticket or pass purchases made with the card and for every mile (or some miles) traveled with a ticket or pass purchased with the card. The earned points can accrue and can be redeemed for a variety of goods and services, including free travel tickets (e.g., airline tickets), offered for selection to the card holder through a catalog or Internet website accessible to the card holder. The card issuer or its fulfillment agent is responsible for fulfilling reward redemptions. The redeemed reward need not be tied to a particular provider of goods or services (e.g., a particular airline).

Along with the credit card transaction information associated with qualifying purchases made with the card, data, such as, for example, Level 3 Data, which can be used to determine miles traveled by the card holder associated with travel tickets or passes purchased with the card flow from the point of purchase to the issuing bank or financial institution (directly, if a credit card association, e.g., MASTERCARD or VISA, is not implicated, or by way of the acquiring bank or financial institution and then the appropriate credit card association if a credit card association is implicated). The qualifying transaction information and the data from which miles traveled can be determined are used to calculate the appropriate number of points earned by the card holder under the inventive rewards platform and program based on rules or other criteria which can reside in a system database of the issuing bank which can include one or more control files or look-up tables.

It is accordingly an object of the present invention to provide a platform and program for enhancing the value of a credit card (or other payment product) to a credit card holder and encouraging increased use of the credit card as a payment device by rewarding the card holder based not only on qualifying purchases but on miles traveled in connection with travel ticket or travel pass purchases.

Another object of the present invention is to provide a system and method which leverages qualifying transaction information and Level 3 Data which automatically flow with such transaction information to effect a credit card rewards platform and program.

A further object of the present invention is to provide a credit card rewards platform and program in which the rewards redeemed by the credit card holder are not tied to a particular provider of goods or services, and rewards fulfillment is managed through the credit card issuer or its fulfillment agent.

The foregoing and other aspects, features and advantages of the invention will in part be obvious and will in part be apparent from this disclosure and accompanying drawings.

The present invention accordingly comprises the features of construction, and combination and arrangement of elements, as well as the several steps and the relation of one or more of such steps with respect to each of the others, all as exemplified in the following detailed disclosure and accompanying drawings, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
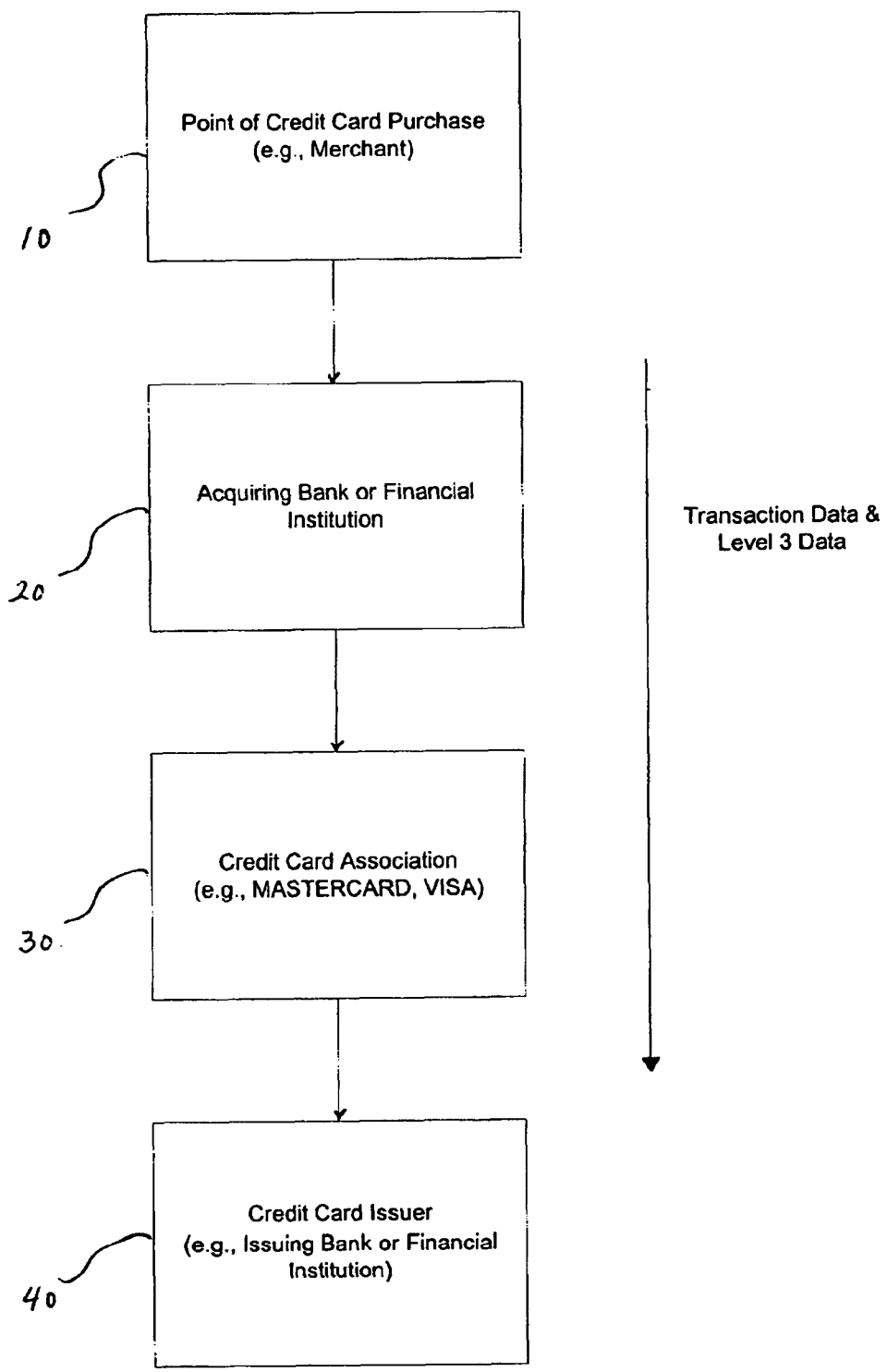
FIG. 1 is a high-level flow chart depicting the flow of requisite data in the credit card rewards platform and program according to a preferred embodiment of the system and method of the present invention.

The present invention is directed to credit cards or other payment products (e.g., including bank cards, smart cards, ATM cards, debit cards and other payment products) and more particularly to a system and method for enhancing the value of a substantially conventional credit card through a rewards platform and program which provide a benefit to the card holder based not only on qualifying purchases using the card but on miles traveled using travel tickets, travel passes or the like purchased with the card, the rewards taking the form of points that can be redeemed (e.g., through a catalog or an Internet website) for goods or services.

It should be appreciated that, from the card holder's perspective, the credit card according to the present invention (as described in greater detail hereinafter) provides all the benefits of an ordinary credit card during use. For example, when a card holder makes a purchase and chooses to pay for the purchase using the credit card, the credit card (or credit card number) is provided to the merchant who processes the purchase in the conventional manner.

From the merchant's perspective, the credit card of the present invention is handled the same way as an ordinary credit card. For example, in processing a credit card purchase, the merchant transmits information about the purchase to the bank or financial institution that issued the card (e.g., directly if a credit card association, e.g., MASTERCARD or VISA, is not implicated, or, if a credit card association is implicated, by way of the merchant's processing bank which transmits the transaction information to the credit card association which then transfers the information to the issuing bank or financial institution). The issuing bank or financial institution then pays the merchant the amount on the credit card receipt (minus any transaction fee or commission) in the conventional manner, typically by applying a credit to the merchant's account (e.g., at the processing bank). The credit card issuer then applies the amount of the purchase to the card holder's balance on the credit card.

The system and method according to the present invention can be implemented using a related combination of automated interfaces and manual processes. It should be appreciated, however, that greater use of automated processing and a wider range of features with multiple executions is also contemplated by the present invention.

The system according to the present invention preferably includes the component elements and means necessary to effect and control the various process steps according to the present invention as described hereinafter. Desirably, and where appropriate, the system utilizes existing computer capabilities, both hardware and software, and electronic communications links, which operate under the control of computer software. The computer software can include sets of software objects and/or program elements collectively having the ability to execute independently in a separate thread or logical chain of process execution, while permitting the flow of data inputs therebetween. Each can be executed as a separate logical server or using a separate physical device.

According to the present invention, the card holder earns points automatically not only for every qualifying purchase including travel (e.g., airline travel) ticket purchases made with the card but for every mile (or some miles) traveled with a travel ticket or travel pass purchased with the card. In one embodiment, up to four legs of a trip associated with a travel ticket or travel pass purchase using the card can be tracked for purposes of earning rewards points. It should be understood, however, that additional or fewer legs of a trip can form the basis for earning rewards points according to the present invention.

Referring now to FIG. 1, which is a high-level flow chart depicting the flow of requisite data in the credit card rewards platform and program according to a preferred embodiment of the system and method of the present invention based on a credit card association model, credit card transaction information associated with qualifying purchases made with the card flows from the point of purchase 10 to the acquiring bank or financial institution 20, then to the appropriate credit card association 30 (e.g., MASTERCARD or VISA) and then to the card issuer 40 (issuing bank or financial institution). Data from which the miles traveled by the card holder associated with travel tickets or travel passes purchased with the card can be determined preferably flow automatically with the other transaction data (i.e., from the point of purchase ultimately to the card issuer).

In a preferred embodiment, the data accompanying the transaction data are Level 3 Data from which, as is known in the art, all travel and entertainment charges and related information recorded in connection with credit cards sponsored by the appropriate credit card associations (e.g., MASTERCARD and VISA) can be ascertained. Level 3 Data can include, for example, an identification of the travel carrier (e.g., airline), ticket number, passenger name, departure date, city of origin (e.g., represented by an airport code), city of destination (e.g., represented by an airport code) and trip legs (e.g., including carrier code, service class, stop-over code and city of destination). Such information can be used to determine miles traveled for purposes of the present invention. In one embodiment utilizing Level 3 Data, up to four legs of a trip associated with a given travel ticket or travel pass purchase using the card can be tracked for purposes of earning rewards points (in the case of travel involving multiple ticket or pass purchases, each trip associated with a given ticket or pass purchase can be tracked up to four legs). It should be understood, however, that additional or fewer legs of a trip can form the basis for earning rewards points according to the credit card rewards platform and program of the present invention.

It should also be understood that the present invention is not limited to a credit card association model. The present invention also has application with respect to payment products issued without the involvement of a credit card association whereby qualifying transaction information and data from which miles traveled can be determined are received directly from the merchant.

The transaction information associated with qualifying purchases made with the card and the accompanying travel-related data (e.g., Level 3 Data) are used by the card issuer to calculate the appropriate number of points earned by the card holder under the inventive rewards platform and program based on predetermined rules or other criteria which can reside in a system database of the card issuer (e.g., in one or more control files or look-up tables).

By way of example, a card holder purchases an airline ticket on airline Z using the credit card according to the present invention; the card holder then uses the ticket to travel from departure point X to a selected destination Y. Under the rewards platform and program according to the present invention, the card holder can be entitled to a certain number of redeemable rewards points based on the ticket purchase as well as a certain number of redeemable rewards points based on the distance traveled from X to Y. Additional qualifying purchases (which can include travel tickets) and additional trips taken using travel tickets purchased with the credit card according to the present invention can entitle the card holder to additional redeemable rewards points.

Earned rewards points can accrue and can be redeemed for a variety of goods and services, including free travel tickets (e.g., airline tickets) on any or a selected carrier, preferably offered for selection to the card holder through the card issuer or its agent, e.g., in a catalog or by means of an Internet website accessible to the card holder. The card issuer or its fulfillment agent is responsible for fulfilling reward redemptions. The redeemed rewards need not be tied to a particular provider of goods or services (e.g., airline Z). Rewards available to the card holder preferably include travel-related benefits such as, for example, free airfare (e.g., destination of the card holder's choosing on the airline of the card holder's choosing), free cruise tickets, free train tickets, discounts on lodging (e.g., of the card holder's choosing), etc.

Desirably, a monthly or other periodic statement from the credit card issuer to the credit card holder for a credit card in accordance with the present invention will include a section displaying the card holder's current accrued rewards points.

From the foregoing, it should be appreciated that all the card holder need do to earn rewards points is make a qualifying purchase which can include the purchase of a travel ticket. The card holder need not contact or provide the card issuer (or any other entity) with receipts, ticket stubs, boarding passes or other information to establish the qualifying purchase and/or travel using a ticket purchased with the card and the card holder's entitlement to rewards points based thereon. The card issuer has this information automatically (by virtue of the transaction information and Level 3 Data) and can provide the card holder with appropriate rewards points and handle fulfillment of rewards redemptions.

It should further be appreciated that the rewards are not tied to any specific provider of goods or services (e.g., a particular airline). Rather, in the case of air travel rewards, the card issuer or its agent preferably has an arrangement with several airlines from which tickets can be purchased as needed, desirably at reduced cost, which tickets can then be provided to the card holder who has selected the tickets (and the carrier and the destination) as the card holder's reward. The rewards platform and program according to the present invention avoids the need for traditional co-brand partnerships with providers of goods and services; and the card issuer (and the card holder) need not be involved in any frequent flyer programs or the like of any carrier.

Figure 2:
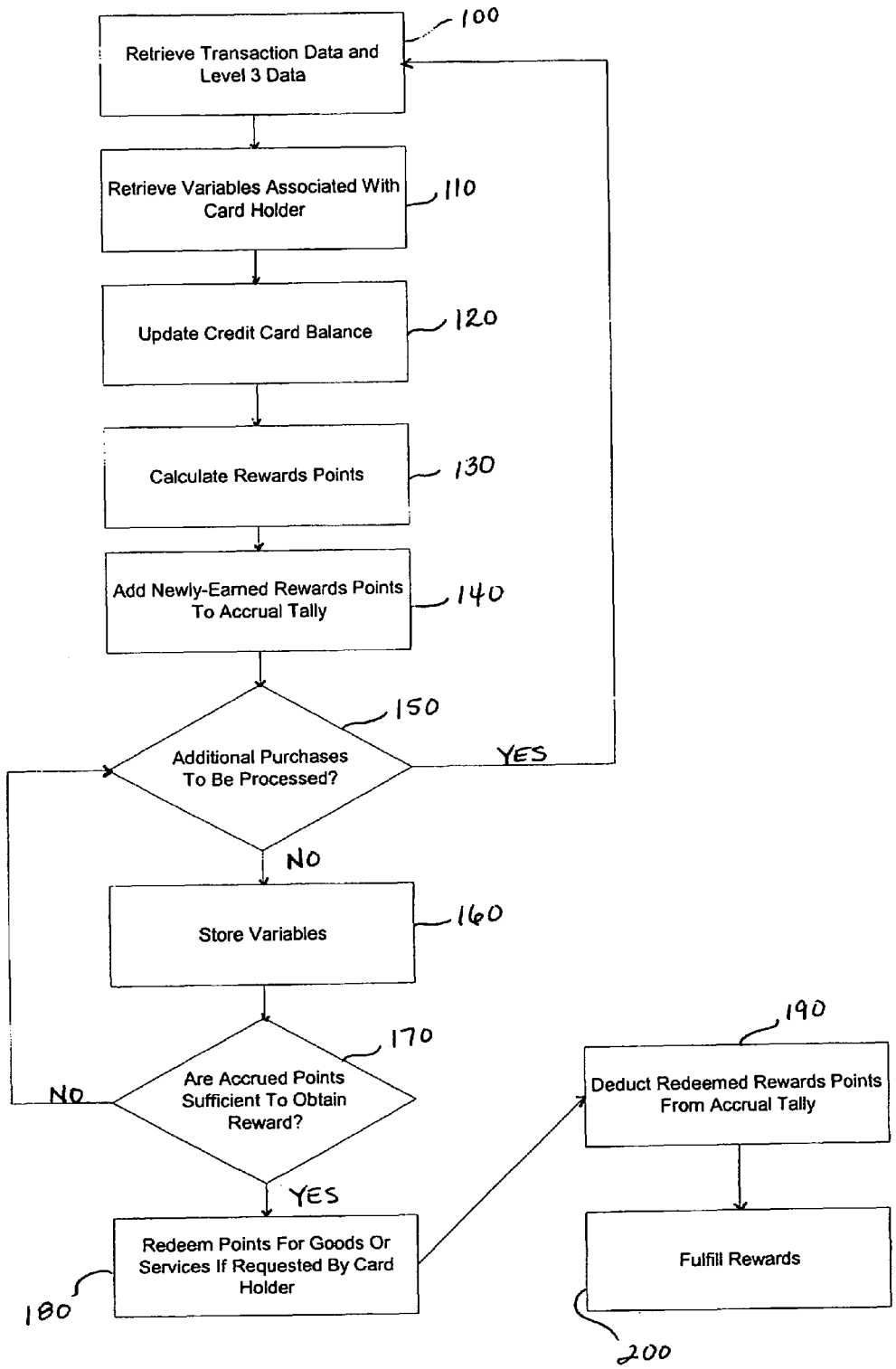
FIG. 2 is a high-level flow chart depicting the process flow in processing a credit card purchase and effecting the credit card rewards program according to a preferred embodiment of the system and method of the present invention.

Referring now to FIG. 2, there are shown steps involved in processing a credit card purchase using the credit card of the present invention and in effecting the credit card rewards program in accordance with a preferred embodiment of the present invention in which a credit card association is implicated. Processing a credit card purchase in accordance with the present invention can include retrieving transaction data and Level 3 Data (step 100).

Transaction data typically include at least the purchase amount, the merchant ID, and the card holder ID; as indicated above, Level 3 Data can include travel carrier, ticket number, passenger name, departure date, city of origin, city of destination and trip legs information from which miles traveled by the card holder associated with travel tickets, travel passes or the like purchased with the card can be determined. Transaction data and Level 3 Data flow from the merchant that processed the card holder's credit card receipt to the acquiring bank 20, then to the appropriate credit card association 30 and then to the card issuer 40 (FIG. 1). Typically, for example, such data are transmitted electronically and stored electronically or on magnetic media readable by a computer. Transaction data can also be transmitted physically (a paper receipt) and subsequently entered into electronic or magnetic storage.

Variables associated with the card holder are then retrieved (step 110). The card holder variables are typically stored electronically or on magnetic media readable by a computer. Card holder variables can include at least the card holder's current balance, accrued rewards points and card holder ID which matches the card holder ID from transaction data. Card holder variables can also include such information necessary for preparing a monthly balance statement to the card holder, such as tracking each purchase for the month, any finance charges accrued and the like.

The next steps can be effected in either order, or can be effected simultaneously. For the sake of this embodiment, the system of the present invention first updates the credit card balance (step 120). Updating the balance involves processing the formula "balance=outstanding balance+new purchase amount." In this way, the variable balance is maintained as the sum of all purchase amounts.

The inventive system calculates rewards points based on the transaction data associated with qualifying purchases made with the card and the Level 3 Data by applying such data to predetermined rules or other criteria which can reside in one or more control files or look-up tables in a system database (step 130). Newly-earned rewards points are added to any accrual balance or tally of rewards points (i.e., the bank updates the card holder's rewards points) (step 140).

The system then determines if additional purchases need to be processed (decision 150). If additional purchases need to be processed, the process repeats at step 100. If additional purchases do not need to be processed, the system stores the variables in electronic or magnetic media readable by a computer (step 160). The stored variables include the newly computed balance and rewards points.

When a card holder has accrued a sufficient quantity of rewards points (decision 170), the points can be redeemed for goods and services (step 180). Redeemed rewards points are deducted from any accrual or tally of a card holder's points (step 190).

Rewards are then fulfilled through the credit card issuer or its agent based on the choices made by the card holders (step 200). This adds value to the credit card issuer, and makes its credit card more desirable, because, unlike conventional credit card rewards programs, the credit card issuer is not a partner with a particular sponsoring entity, and therefore is free to make other business affiliations with providers of goods or services (e.g., to provide additional incentives to card holders to use the issuer's products).

It should be understood by those of ordinary skill in the art that the credit card rewards platform and program according to the present invention do not preclude the inclusion of additional features and benefits. For example, the credit card of the invention may include a color photo of the card holder bonded onto the credit card. The photo, in addition to helping to deter fraud if the card is lost or stolen, adds a visual identification to the merchant approval process.

Many credit card issuers can replace lost or stolen credit cards, typically within 24 hours of notice. In addition, credit card issuers may provide a service to help replace lost or stolen airline tickets, provide emergency cash up to the available credit advance limit on the credit card, and furnish information on how to replace important documents that may have also been lost or stolen. Additionally, credit card issuers may offer credit card holders insurance-type protection (e.g., covering travel mishaps).

Credit card issuers can also keep track and alert card members of unauthorized use of a credit card by monitoring purchase patterns. When unusual charges are noticed, card holders may be called and asked to verify that authorized card users are in fact making the charges.

Also, a toll-free number may be staffed by customer service representatives 365 days a year. Customer service can provide replacement cards and answer questions regarding customer accounts.

All of these additional benefits can be included along with the rewards platform and program of the present invention.

In accordance with the foregoing, the present invention provides a program for enhancing the value and desirability of a credit card (or other payment product) to a credit card holder and encouraging increased use of the credit card as a payment device by rewarding the card holder based on qualifying purchases and miles traveled in connection with travel ticket purchases. The inventive program leverages qualifying transaction information and other data, such as, for example, Level 3 Data, which automatically flow with such transaction information. The rewards redeemed by the credit card holder according to the inventive program are not tied to a particular provider of goods or services, and reward fulfillment is managed through the credit card issuer or its fulfillment agent.

In so far as embodiments of the invention described herein are implemented, at least in part, using software controlled programmable processing devices, such as a computer system, it will be appreciated that one or more computer programs for configuring such programmable devices or system of devices to implement the foregoing described credit card rewards platform and program are to be considered an aspect of the present invention. The computer programs can be embodied as source code and undergo compilation for implementation on processing devices or a system of devices, or can be embodied as object code, for example. Those of ordinary skill in the art will readily understand that the term computer in its most general sense encompasses programmable devices such as those referred to above, and data processing apparatus, computer systems and the like. Preferably, the computer programs are stored on carrier media in machine or device readable form, for example in solid-state memory or magnetic memory such as disk or tape, and processing devices utilize the programs or parts thereof to configure themselves for operation.

It should be appreciated that the aspects, features and advantages made apparent from the foregoing and the accompanying drawings are efficiently attained and, since certain changes may be made in the disclosed constructions and processes without departing from the spirit and scope of the invention, it is intended that all matter contained herein and in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computerized method for rewarding use of a payment product by the payment product holder, the method comprising the steps of:
   (a) issuing a payment product from an issuer to a holder, said payment product representing funds available to said holder, said payment product providing means of payment for at least one purchase transaction by said holder,
   (b) comparing said at least one purchase transaction using said payment product with pre-defined rewards eligibility criteria of said issuer to determine whether said at least one purchase transaction is a qualifying purchase transaction in compliance with said pre-defined rewards eligibility criteria, said comparing being performed by a data processor;
   (c) calculating and storing a first value redeemable by said holder for at least one benefit based on said at least one purchase transaction when said at least one purchase transaction is a qualifying purchase transaction, said calculating and storing being performed by a data processor;
   (d) determining one or more travel distance associated with said qualifying purchase transaction and calculating and storing a second value redeemable by said holder for said at least one benefit based on said determined travel distances, said calculating and storing being performed by a data processor, and
   (e) providing access to said stored value and said stored additional value to said holder to facilitate redemption of at least a part of at least one of said first value and said second value,
   wherein said pre-defined rewards eligibility criteria provide that a qualified purchase transaction is a transaction in which a ticket or a travel pass for any of various authorized travel modes is purchased, said authorized travel modes including at least two of air, water, bus, vehicle and locomotive.

2. The method according to claim 1, wherein said payment product is at least one of a credit card, a debit card, a bank card, a smart card, and an automated teller machine card.

3. The method according to claim 1, wherein said qualifying purchase transaction includes the purchase of at least one of goods and services from any provider thereof.

4. The method according to claim 1, further comprising the step of presenting said at least one benefit for selection by said holder in a catalog including at least one of goods and services.

5. The method according to claim 4, wherein said at least one benefit is selected from a provider of at least one of goods and services different from a provider of at least one of goods and services associated with said qualifying purchase transaction.

6. The method according to claim 4, wherein said at least one benefit includes at least one of goods and services that are travel-related.

7. The method according to claim 6, wherein said at least one benefit is at least one of free and discounted travel on a carrier of said holder's choosing.

8. The method according to claim 6, wherein said at least one benefit is at least one of free and discounted travel to a destination of said holder's choosing.

9. The method according to claim 6, wherein said at least one benefit is at least one of free and discounted lodging of said holder's choosing.

10. The method according to claim 4, wherein said catalog is provided over a global computer network.

11. The method according to claim 10, wherein said global computer network is the Internet.

12. The method according to claim 1, further comprising the step of fulfilling a request by said holder to redeem said at least a part of at least one of said first value and said second value.

13. The method according to claim 12, wherein said step of fulfilling a request by said holder to redeem at least part of said at least one of said first value and said second value is effected by at least one of said issuer and a fulfillment representative of said issuer.

14. The method according to claim 1, further comprising the step of obtaining Level 3 Data associated with said qualifying purchase transaction, and wherein said step of determining a travel distance associated with said at least one travel ticket is based on said Level 3 Data.

15. The method according to claim 14, wherein said Level 3 Data is obtained together with transaction data associated with said qualifying purchase transaction.

16. The method according to claim 14, wherein individual legs of a trip associated with each travel ticket purchased with said payment product are accounted for using said Level 3 Data.

17. The method according to claim 12, wherein said value and said additional value are accruable in an accrued rewards value balance, and wherein said step of fulfilling a request by said holder to redeem said at least a part of at least one of said first value and said second value is effected when said accrued rewards value balance is at least one of equal to and greater than a pre-selected threshold amount associated with said at least one benefit.

18. A computerized method for effecting a rewards program based on use of a payment product, the method comprising the steps of:

(a) retrieving payment product data associated with a payment product issued by an issuer to a holder, said payment product data including a holder identification and an accrued rewards value balance, (b) retrieving transaction data associated with at least one purchase transaction using said payment product, (c) comparing said transaction data against pre-defined rewards eligibility criteria to determine whether said at least one purchase transaction using said payment product is a qualifying purchase transaction in compliance with said pre-defined rewards eligibility criteria, said comparing being performed by a data processor, (d) calculating a first value redeemable by said holder for at least one benefit based on said at least one purchase transaction when said at least one purchase transaction using said payment product is a qualifying purchase transaction, said calculating being performed by a data processor, (e) retrieving travel-related purchase data associated with travel-related purchases included in said qualifying purchase transaction, (f) determining from said travel-related purchase data one or more travel distances associated with said qualifying purchase transaction and calculating a second value redeemable by said holder for said at least one benefit based on said determined travel distances, said determining and calculating being performed by a data processor, (f) updating said accrued rewards value balance based on at least one of said calculated first value and said calculated second value, (g) comparing said accrued rewards value balance against a pre-selected threshold amount associated with said at least one benefit to ascertain whether said accrued rewards value balance is sufficient to entitle said holder to receive said at least one benefit, said comparing being performed by a data processor, and (h) providing said holder with access to said accrued rewards value balance to facilitate redemption of at least a part of said accrued rewards value balance for said at least one benefit, wherein said pre-defined rewards eligibility criteria provide that a qualified purchase transaction is a transaction in which a ticket or a travel pass for any of various authorized travel modes is purchased, said authorized travel modes including at least two of air, water, bus, vehicle and locomotive.

19. The method according to claim 18, further comprising the steps of receiving a request by said holder to redeem at least a part of said accrued rewards value balance for said at least one benefit, deducting any redeemed first value and second value from said accrued rewards value balance, and fulfilling said request.

20. The method according to claim 19, wherein said step of fulfilling said request is effected by at least one of said issuer and a fulfillment representative of said issuer.

21. The method according to claim 18, wherein said payment product is at least one of a credit card, a debit card, a bank card, a smart card, and an automated teller machine card.

22. The method according to claim 18, wherein said qualifying purchase transaction includes the purchase of at least one of goods and services from any provider thereof.

23. The method according to claim 18, further comprising the step of presenting said at least one benefit for selection by said holder in a catalog including at least one of goods and services.

24. The method according to claim 23, wherein said at least one benefit is selected from a provider of at least one of goods and services different from a provider of at least one of goods and services associated with said qualifying purchase transaction.

25. The method according to claim 23, wherein said at least one benefit includes at least one of goods and services that are travel-related.

26. The method according to claim 25, wherein said at least one benefit is at least one of free and discounted travel on a carrier of said holder's choosing.

27. The method according to claim 25, wherein said at least one benefit is at least one of free and discounted travel to a destination of said holder's choosing.

28. The method according to claim 25, wherein said at least one benefit is at least one of free and discounted lodging of said holder's choosing.

29. The method according to claim 23, wherein said catalog is provided over a global computer network.

30. The method according to claim 29, wherein said global computer network is the Internet.

31. The method according to claim 18, wherein said travel-related purchase data is Level 3 Data.

32. The method according to claim 31, wherein individual legs of a trip associated with each travel ticket purchased with said payment product are accounted for using said Level 3 Data.

33. A computerized system for rewarding use of a payment product by the payment product holder, the system comprising:
   a payment product issued from an issuer to a holder, said payment product representing funds available to said holder, said payment product providing means of payment for at least one purchase transaction by said holder,
   at least one data processor adapted to (i) compare said at least one purchase transaction using said payment product with pre-defined rewards eligibility criteria of said issuer to determine whether said at least one purchase transaction is a qualifying purchase transaction in compliance with said pre-defined rewards eligibility criteria, (ii) calculate and store a first value redeemable by said holder for at least one benefit based on said at least one purchase transaction when said at least one purchase transaction is a qualifying purchase transaction, (iii) determine one or more travel distances associated with said qualifying purchase transaction, and calculate and store a second value redeemable by said holder for said at least one benefit based on said determined travel distances, and
   provide access to said stored first value and said stored second value to said holder to facilitate redemption of at least a part of at least one of said first value and said second value,
   wherein said pre-defined rewards eligibility criteria provide that a qualified purchase transaction is a transaction in which a ticket or a travel pass for any of various authorized travel modes is purchased, said authorized travel modes including at least two of air, water, bus, vehicle and locomotive.

34. The system according to claim 33, wherein said payment product is at least one of a credit card, a debit card, a bank card, a smart card, and an automated teller machine card.

35. The system according to claim 33, wherein said qualifying purchase transaction includes the purchase of at least one of goods and services from any provider thereof.

36. The system according to claim 33, further comprising a catalog including at least one of goods and services for presenting said at least one benefit for selection by said holder.

37. The system according to claim 36, wherein said at least one benefit is selected from a provider of at least one of goods and services different from a provider of at least one of goods and services associated with said qualifying purchase transaction.

38. The system according to claim 36, wherein said at least one benefit includes at least one of goods and services that are travel-related.

39. The system according to claim 38, wherein said at least one benefit is at least one of free and discounted travel on a carrier of said holder's choosing.

40. The system according to claim 38, wherein said at least one benefit is at least one of free and discounted travel to a destination of said holder's choosing.

41. The system according to claim 38, wherein said at least one benefit is at least one of free and discounted lodging of said holder's choosing.

42. The system according to claim 36, wherein said catalog is provided over a global computer network.

43. The system according to claim 42, wherein said global computer network is the Internet.

44. The system according to claim 33, wherein said at least one data processor is adapted to receive and utilize Level 3 Data associated with said qualifying purchase transaction for determining said travel distance associated with said at least one travel ticket.

45. The system according to claim 44, wherein said at least one data processor is adapted to account for individual legs of a trip associated with each travel ticket purchased with said payment product using said Level 3 Data.

46. The system according to claim 33, wherein said value and said additional value accumulated and unredeemed by said holder are stored in an accrued rewards value balance.

47. A computerized system for effecting a rewards program based on use of a payment product, the system comprising:
   at least one data processor adapted to (i) retrieve payment product data associated with a payment product issued by an issuer to a holder, said payment product data including a holder identification and an accrued rewards value balance,
   (ii) retrieve transaction data associated with at least one purchase transaction using said payment product,
   (iii) compare said transaction data against pre-defined rewards eligibility criteria to determine whether said at least one purchase transaction using said payment product is a qualifying purchase transaction in compliance with said pre-defined rewards eligibility criteria,
   (iv) calculate a first value redeemable by said holder for at least one benefit based on said at least one purchase transaction when said at least one purchase transaction using said payment product is a qualifying purchase transaction,
   (v) retrieve travel-related purchase data associated with travel-related purchases included in said qualifying purchase transaction,
   (vi) determine one or more travel distances associated with said qualifying purchase transaction, and calculate and store a second value redeemable by said holder for said at least one benefit based on said determined travel distances,
   (vii) update said accrued rewards value balance based on at least one of said calculated first value and said calculated second value, (viii) compare said accrued rewards value balance against a pre-selected threshold amount associated with said at least one benefit to ascertain whether said accrued rewards value balance is sufficient to entitle said holder to receive said at least one benefit, and (ix) provide said holder with access to said accrued rewards value balance to facilitate redemption of at least a part of said accrued rewards value balance for said at least one benefit, wherein said pre-defined rewards eligibility criteria provide that a qualified purchase transaction is a transaction in which a ticket or a travel pass for any of various authorized travel modes is purchased, said authorized travel modes including at least two of air, water, bus, vehicle and locomotive.

48. The system according to claim 47, wherein said payment product is at least one of a credit card, a debit card, a bank card, a smart card, and an automated teller machine card.

49. The system according to claim 47, wherein said qualifying purchase transaction includes the purchase of at least one of goods and services from any provider thereof.

50. The system according to claim 47, further comprising a catalog including at least one of goods and services for presenting said at least one benefit for selection by said holder.

51. The system according to claim 50, wherein said at least one benefit is selected from a provider of at least one of goods and services different from a provider of at least one of goods and services associated with said qualifying purchase transaction.

52. The system according to claim 50, wherein said at least one benefit includes at least one of goods and services that are travel-related.

53. The system according to claim 52, wherein said at least one benefit is at least one of free and discounted travel on a carrier of said holder's choosing.

54. The system according to claim 52, wherein said at least one benefit is at least one of free and discounted travel to a destination of said holder's choosing.

55. The system according to claim 52, wherein said at least one benefit is at least one of free and discounted lodging of said holder's choosing.

56. The system according to claim 50, wherein said catalog is provided over a global computer network.

57. The system according to claim 56, wherein said global computer network is the Internet.

58. The system according to claim 47, wherein said travel-related purchase data is Level 3 Data.

59. The system according to claim 58, wherein said at least one data processor is adapted to account for individual legs of a trip associated with each travel ticket purchased with said payment product using said Level 3 Data.

60. A computer program product comprising a computer usable physical medium storing a computer executable program to:

(a) compare at least one purchase transaction effected using a payment product issued to a holder from an issuer against pre-defined rewards eligibility criteria of said issuer to determine whether said at least one purchase transaction is a qualifying purchase transaction in compliance with said pre-defined rewards eligibility criteria, (b) calculate and store a first value redeemable by said holder for at least one benefit based on said at least one purchase transaction when said at least one purchase transaction is a qualifying purchase transaction, (c) determine one or more travel distances associated with said qualifying purchase transaction, and calculate and store a second value redeemable by said holder for said at least one benefit based on said determined travel distances, and (d) provide access to said value and said second value to said holder to facilitate redemption of at least a part of at least one of said first value and said second value for said at least one benefit, wherein said pre-defined rewards eligibility criteria provide that a qualified purchase transaction is a transaction in which a ticket or a travel pass for any of various authorized travel modes is purchased, said authorized travel modes including at least two of air, water, bus, vehicle and locomotive.

61. The computer program product of claim 60, wherein said payment product is at least one of a credit card, a debit card, a bank card, a smart card, and an automated teller machine card.

62. The computer program product of claim 60, wherein said determination of said travel distance associated with said at least one travel ticket is based on Level 3 Data associated with said qualifying purchase transaction.

63. The computer program product of claim 62, wherein individual legs of a trip associated with each travel ticket purchased with said payment product are accounted for using said Level 3 Data.

64. The computer program product of claim 60, wherein said first value and said second value are accruable in an accrued rewards value balance, and wherein fulfillment of a request by said holder to redeem said at least a part of at least one of said first value and said second value is effected when said accrued rewards value balance is at least one of equal to and greater than a pre-selected threshold amount.

* * * * *